United States Patent
Ding et al.

(10) Patent No.: US 12,271,974 B2
(45) Date of Patent: Apr. 8, 2025

(54) GENERATION OF BIRD'S-EYE-VIEW IMAGES AND SEGMENTATION MAPS

(71) Applicant: Volvo Car Corporation, Gothenburg (SE)

(72) Inventors: Sihao Ding, Sunnyvale, CA (US); Ekta U. Samani, Seattle, WA (US)

(73) Assignee: Volvo Car Corporation, Gothenburg (SE)

( * ) Notice: Subject to any disclaimer, the term of this patent is extended or adjusted under 35 U.S.C. 154(b) by 337 days.

(21) Appl. No.: 17/662,580

(22) Filed: May 9, 2022

(65) Prior Publication Data

US 2023/0360279 A1 Nov. 9, 2023

(51) Int. Cl.
| | |
|---|---|
| *G06V 20/17* | (2022.01) |
| *G06T 11/00* | (2006.01) |
| *G06V 10/26* | (2022.01) |
| *G06V 10/774* | (2022.01) |
| *G06V 10/82* | (2022.01) |

(52) U.S. Cl.
CPC .............. *G06T 11/00* (2013.01); *G06V 10/26* (2022.01); *G06V 10/7747* (2022.01); *G06V 20/17* (2022.01); *G06V 10/82* (2022.01)

(58) Field of Classification Search
CPC ..... B60R 1/00; B60R 2300/607; G06T 11/00; G06V 10/26; G06V 10/7747; G06V 10/82; G06V 20/17
See application file for complete search history.

(56) References Cited

U.S. PATENT DOCUMENTS

| | | | |
|---|---|---|---|
| 11,189,007 B2 * | 11/2021 | Nikola | G01C 21/3822 |
| 11,238,650 B2 | 2/2022 | Li et al. | |
| 11,247,609 B2 | 2/2022 | Fursich et al. | |
| 11,269,426 B2 | 3/2022 | Jorasch et al. | |
| 2010/0322476 A1 * | 12/2010 | Kanhere | G06V 10/763 |
| | | | 382/103 |
| 2012/0041722 A1 * | 2/2012 | Quan | G06T 7/579 |
| | | | 703/1 |
| 2013/0070095 A1 * | 3/2013 | Yankun | G06V 20/58 |
| | | | 348/148 |

(Continued)

OTHER PUBLICATIONS

Tom Bruls et al., "The Right (Angled) Perspective: Improving the Understanding of Road Scenes Using Boosted Inverse Perspective Mapping," Aug. 29, 2019, 2019 IEEE Intelligent Vehicles Symposium (IV) Paris, France. Jun. 9-12, 2019, pp. 302-307.*

(Continued)

*Primary Examiner* — Omar S Ismail
(74) *Attorney, Agent, or Firm* — Amin, Turocy & Watson, LLP

(57) ABSTRACT

Techniques are described for generating bird's eye view (BEV) images and segmentation maps. According to one or more embodiments, a system is provided comprising a processor that executes computer executable components stored in at least one memory, comprising a machine learning component that generates a synthesized bird's eye view image from a stitched image based on removing artifacts from the stitched image present from a transformation process. The system further comprising a generator that produces the synthesized bird's eye view image and a segmentation map, and a discriminator that predicts whether the synthesized bird's eye view image and the segmentation map are real or generated.

20 Claims, 15 Drawing Sheets

(56) References Cited

U.S. PATENT DOCUMENTS

| | | | |
|---|---|---|---|
| 2013/0155058 A1* | 6/2013 | Golparvar-Fard | G06Q 10/06311 345/419 |
| 2013/0321424 A1* | 12/2013 | Pylappan | G06T 3/40 345/440 |
| 2014/0063197 A1* | 3/2014 | Yamamoto | G06T 11/001 348/46 |
| 2014/0152827 A1* | 6/2014 | Yamamoto | B60R 1/27 348/148 |
| 2015/0367848 A1* | 12/2015 | Terashima | B60W 30/0956 701/25 |
| 2017/0115742 A1* | 4/2017 | Xing | G06F 3/0485 |
| 2018/0232947 A1* | 8/2018 | Nehmadi | G01S 7/295 |
| 2018/0276835 A1* | 9/2018 | Amano | G06T 7/564 |
| 2019/0050648 A1* | 2/2019 | Stojanovic | G06V 20/13 |
| 2019/0147582 A1* | 5/2019 | Lee | G06T 11/00 382/156 |
| 2019/0286921 A1* | 9/2019 | Liang | G06F 16/909 |
| 2019/0303669 A1* | 10/2019 | Spooner | G06N 3/08 |
| 2019/0384304 A1 | 12/2019 | Towal et al. | |
| 2020/0041612 A1* | 2/2020 | Harrison | G01S 7/40 |
| 2020/0074239 A1* | 3/2020 | Park | G06F 18/217 |
| 2020/0353943 A1* | 11/2020 | Siddiqui | G06N 3/045 |
| 2021/0023992 A1* | 1/2021 | Broggi | G02B 27/0101 |
| 2021/0150230 A1* | 5/2021 | Smolyanskiy | G06V 10/764 |
| 2021/0173916 A1 | 6/2021 | Ortiz et al. | |
| 2021/0188167 A1 | 6/2021 | Fursich et al. | |
| 2021/0197720 A1* | 7/2021 | Houston | G06N 3/045 |
| 2021/0197813 A1* | 7/2021 | Houston | B60W 30/143 |
| 2021/0201050 A1* | 7/2021 | Marschner | G06F 18/217 |
| 2021/0209785 A1* | 7/2021 | Unnikrishnan | G01S 7/41 |
| 2021/0297633 A1* | 9/2021 | Motoyama | G05D 1/02 |
| 2021/0303925 A1 | 9/2021 | Hofmann et al. | |
| 2021/0327128 A1* | 10/2021 | Yu | G06T 19/20 |
| 2022/0044024 A1* | 2/2022 | Sambo | G06T 7/20 |

OTHER PUBLICATIONS

Yu-Chih Liu et al.,"Bird's-Eye View Vision System for Vehicle Surrounding Monitoring," Sommer, G., Klette, R. (eds) Robot Vision. RobVis 2008. Lecture Notes in Computer Science, vol. 4931. Springer, Berlin, Heidelberg. https://doi.org/10.1007/978-3-540-78157-8_16, pp. 208-217.*

Xiang Li et al.,"Building-A-Nets: Robust Building Extraction From High-Resolution Remote Sensing Images With Adversarial Networks," Oct. 15, 2018,IEEE Journal of Selected Topics in Applied Earth Observations and Remote Sensing, vol. 11, No. 10, Oct. 2018, pp. 3680-3684.*

Zizhang Wu et al.,"Disentangling and Vectorization: A 3D Visual Perception Approach for Autonomous Driving Based on Surround-View Fisheye Cameras," Dec. 16, 2021,2021 IEEE/RSJ International Conference on Intelligent Robots and Systems (IROS), Sep. 27-Oct. 1, 2021. Prague, Czech Republic,pp. 5576-558.*

Marcel Schreiber et al., "Long-Term Occupancy Grid Prediction Using Recurrent Neural Networks," Aug. 12, 2019, 2019 International Conference on Robotics and Automation (ICRA),Palais des congres de Montreal, Montreal, Canada, May 20-24, 2019, pp. 9299-9304.*

Edgar Cortés Gallardo Medina et al.,"Object Detection, Distributed Cloud Computing and Parallelization Techniques for Autonomous Driving Systems," Mar. 25, 2021,Applied Science, https://www.mdpi.com/journal/applsci,Appl. Sci. 2021, 11, 2925, pp. 1-13.*

Qin Zou et al.,"Robust Lane Detection From Continuous Driving Scenes Using Deep Neural Networks," Jan. 15, 2020,IEEE Transactions on Vehicular Technology, vol. 69, No. 1, Jan. 2020,pp. 41-52.*

Davy Neven et al.,"Towards End-to-End Lane Detection: an Instance Segmentation Approach," Oct. 21, 2018,IEEE Intelligent Vehicles Symposium (IV),Changshu, Suzhou, China, Jun. 26-30, 2018,pp. 286-289.*

Yigit Baran Can et al.,"Understanding Bird's-Eye View of Road Semantics Using an Onboard Camera," Feb. 8, 2022,IEEE Robotics and Automation Letters, vol. 7, No. 2, Apr. 2022,pp. 3302-3308.*

Shang-Lin Yu et al.,"Vehicle Detection and Localization on Bird's Eye View Elevation Images Using Convolutional Neural Network," Oct. 30, 2017,2017 IEEE International Symposium on Safety, Security and Rescue Robotics (SSRR),Shanghai, China, Oct. 11-13, 2017,pp. 102-108.*

Neven, D. et al. | "Towards End-to-End Lane Detection: an Instance Segmentation Approach" .arXiv:1802.05591v1 [cs.CV] Feb. 15, 2018, 7 pages.

Extended European Search Report received for European Patent Application Serial No. 23172328.9 dated Oct. 6, 2023, 9 pages.

Yu et al., "Vehicle Detection and Localization on Bird's Eye View Elevation Images Using Convolutional Neural Network", IEEE, International Symposium on Safety, Security and Rescue Robotics, Oct. 11-13, 2017, pp. 102-109.

Li et al., "Building-A-Nets: Robust Building Extraction from High-Resolution Remote Sensing Images with Adversarial Networks", IEEE, Journal of Selected Topics in Applied Earth Observations and Remote Sensing, vol. 11, No. 10, Oct. 2018, pp. 3680-3687.

Schreiber et al., "Long-Term Occupancy Grid Prediction Using Recurrent Neural Networks", International Conference on Robotics and Automation, May 20-24, 2019, pp. 9299-9305.

Liu et al., "Bird's Eye View Vision System for Vehicle Surrounding Monitoring", Robot Vision, Lecture Notes in Computer Science, vol. 4931, 2008, pp. 207-218.

* cited by examiner

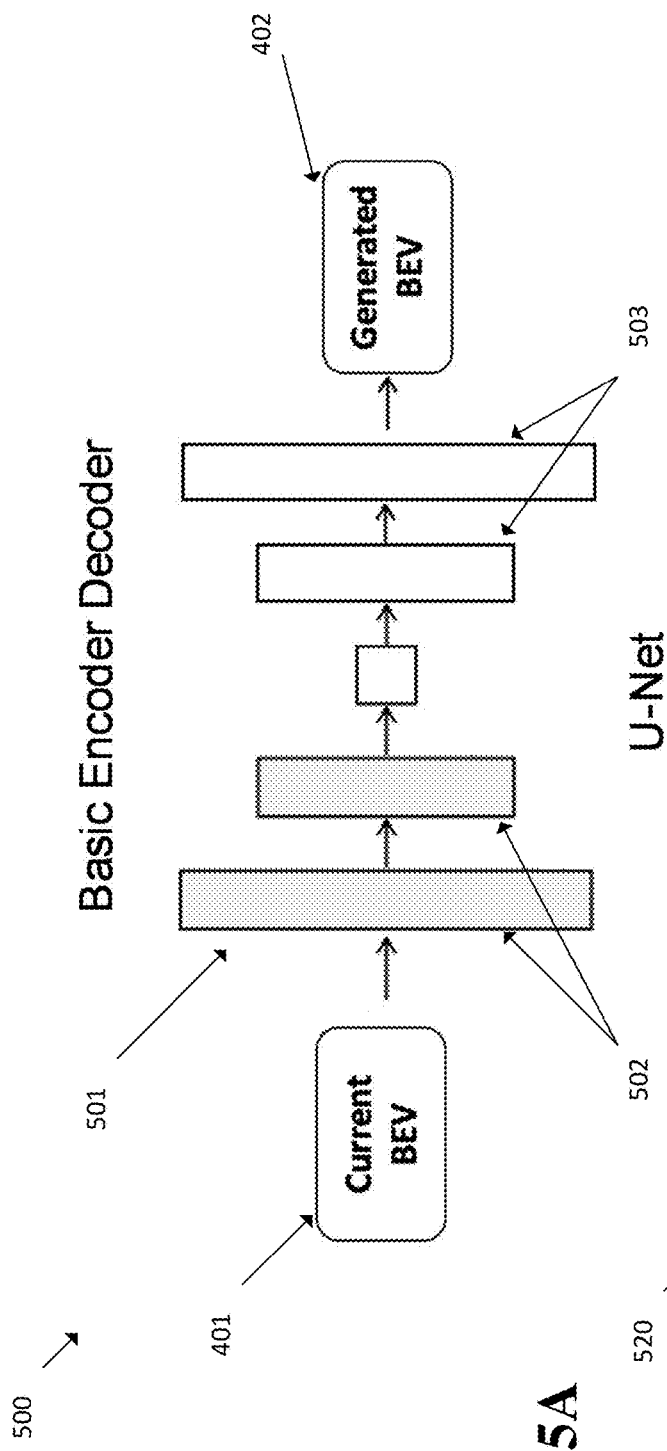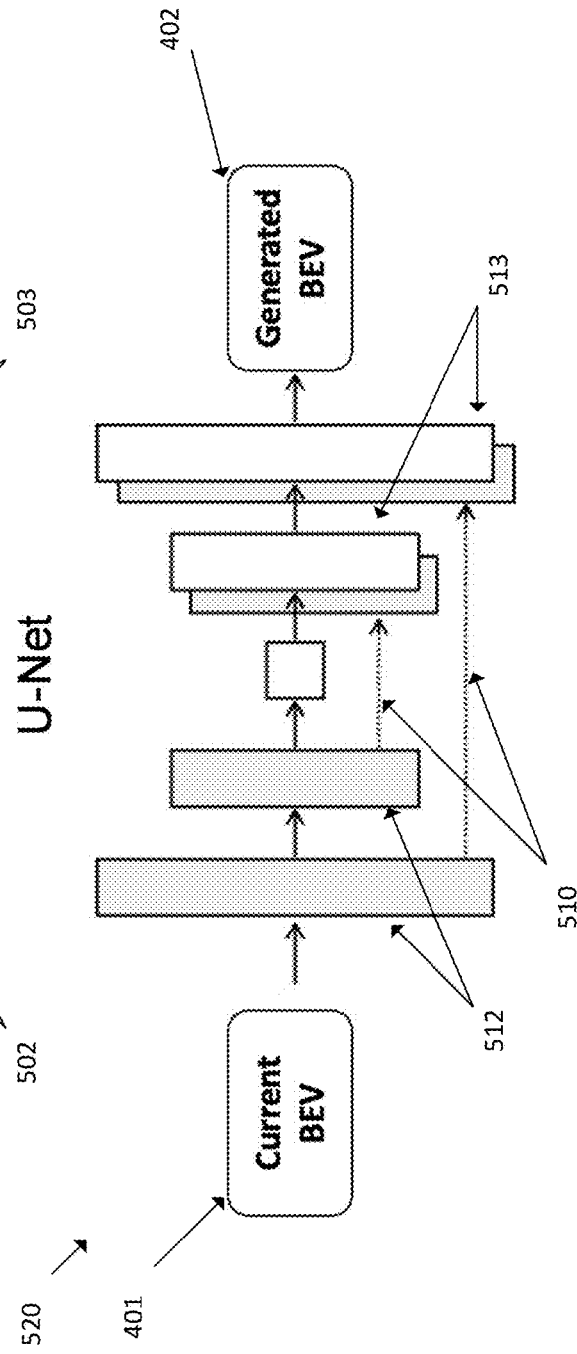
FIG. 5A
FIG. 5B

GENERATION OF BIRD'S-EYE-VIEW IMAGES AND SEGMENTATION MAPS

TECHNICAL FIELD

This application relates to techniques facilitating generation of bird's eye view (BEV) images and segmentation maps.

BACKGROUND

There has recently been a rapid increase in driver assistance and vehicle automation features in automobiles, such as lane detection, object detection, parking assist, and others. As a result, automotive manufactures are turning to ways to improve these functions. For example, bird's eye view (BEV) images can be utilized in numerous functions such, as automated driving, automated parking assist, or output to a display screen to assist a driver. In this regard, accurately generating BEV images can lead to improved performance of driver assistance and vehicle automation functions, as well as an improved driver experience.

A major issue with BEV generation is limiting and/or preventing distortion in the BEV. For example, exiting BEV generation often produces BEV images that are distorted and/or include artifacts from a transformation process. This distortion and addition of artifacts can create inaccurate and difficult to process images, leading to decreased performance in driver assistance and automation features, as well as limiting the usefulness of a BEV image to a driver.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are presented that facilitate generation of BEV images and segmentation maps.

According to one or more embodiments, a system is provided that facilitates generation of BEV images, the system comprising a processor that executes computer executable components stored in at least one memory. The computer executable components can comprise a machine learning component that generates a synthesized bird's eye view image from a stitched image based on removing artifacts from the stitched image present from a transformation process.

In one or more implementations, the machine learning component can comprise a generator component that produces the synthesized bird's eye view image and/or a segmentation map. The machine learning component can additionally comprise a discriminator component that predicts whether the synthesized bird's eye view image and the segmentation map are real or generated. For example, the prediction of the discriminator can be utilized to train the generator to produce more accurate synthesized bird's eye view images and segmentation maps.

In some embodiments, elements described in connection with the disclosed systems can be embodied in different forms such as computer-implemented methods, computer program products, or other forms.

An advantage of the one or more systems, computer-implemented methods and/or computer program products can be generation of synthesized BEV images without artifacts or distortion. Accordingly, distortion or artifacts inherent in BEV images generated from other transformation processes can be avoided, leading to more accurate and easily understood BEV images.

DESCRIPTION OF THE DRAWINGS

FIGS. 5A and 5B illustrate various examples of generators used in non-limiting systems that facilitates generation of bird's eye view images and segmentation maps.

DETAILED DESCRIPTION

The following detailed description is merely illustrative and is not intended to limit embodiments and/or application or uses of embodiments. Furthermore, there is no intention to be bound by any expressed or implied information presented in the preceding Summary section or in the Detailed Description section.

The disclosed subject matter is directed to facilitating generation of bird's eye view (BEV) images and segmentation maps, thereby improving driver assistance and vehicle automation functions as well as driver experience. For example, a machine learning model can be utilized to generate BEV images and segmentation maps that minimize or eliminate the distortion and or artifacts created by existing BEV generation techniques.

Figure 1C:
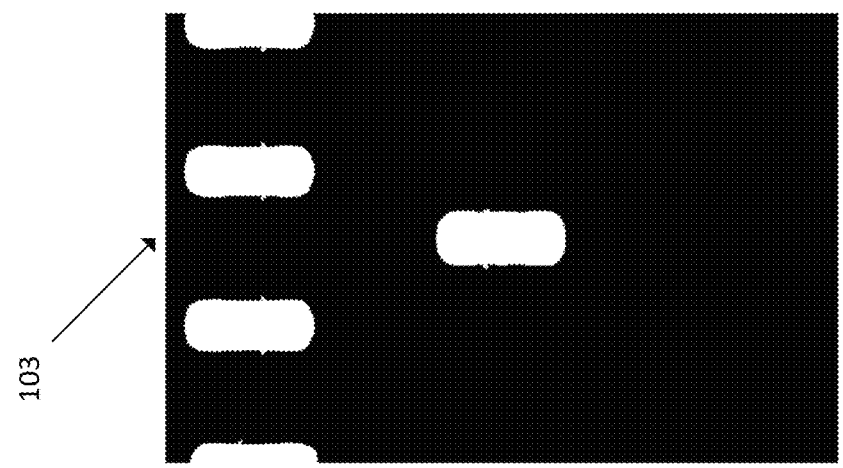
FIGS. 1A-1C illustrates various examples of bird's eye view images.
Figure 1B:
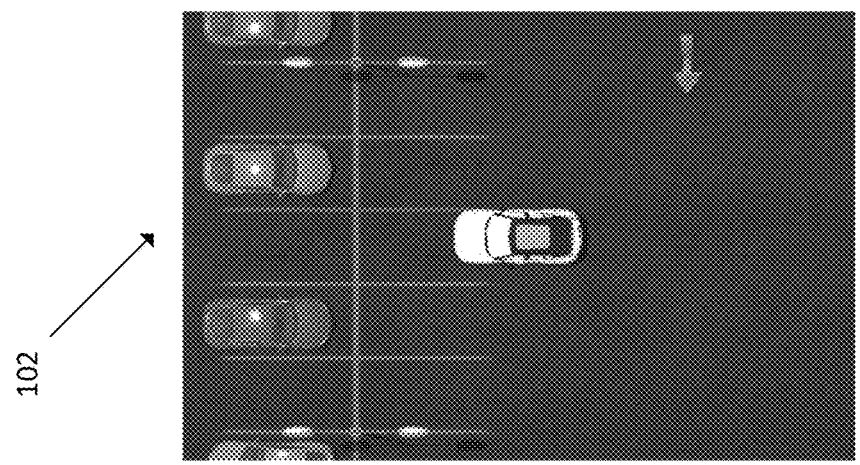
Figure 1A:
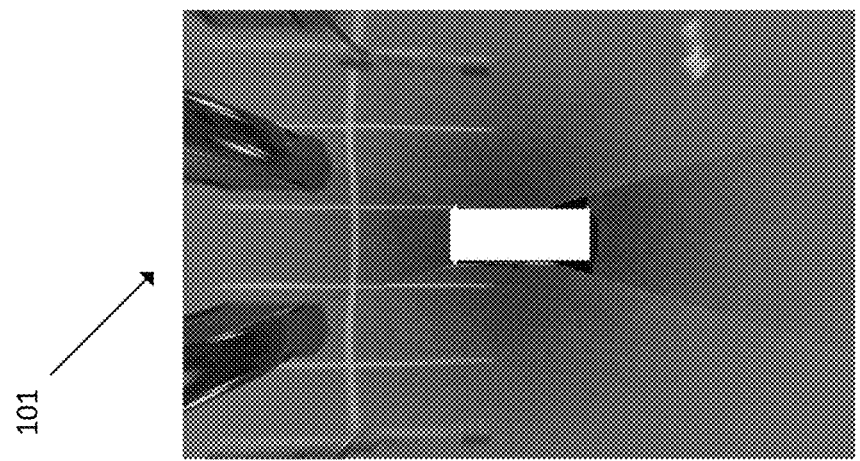

Turning now to the drawings, FIGS. 1A-1C illustrate various examples of bird's eye view images and segmentation maps in accordance with one or more embodiments of the disclosed subject matter. For example, picture 101 of FIG. 1A illustrates an existing stitched BEV image. Picture 101 can be produced by a transformation process which stiches two or more images together to produce a BEV. In order to capture the area around a vehicle, fish-eye cameras are often used to take the pictures that are stitched together to create picture 101. As shown, this process results in picture 101 have a large amount of distortion and artifacts from the transformation and stitching process, thereby limiting the accuracy and usefulness of picture 101. Picture 102 of FIG. 1B illustrates a desired BEV image. For example, as shown picture 102 has no distortion or artifacts, thereby improving its accuracy and usefulness. Picture 103 of FIG. 1C illustrates a desired segmentation map. As shown picture 103 also has no distortion or artifacts, thereby improving its accuracy and usefulness.

Figure 2:
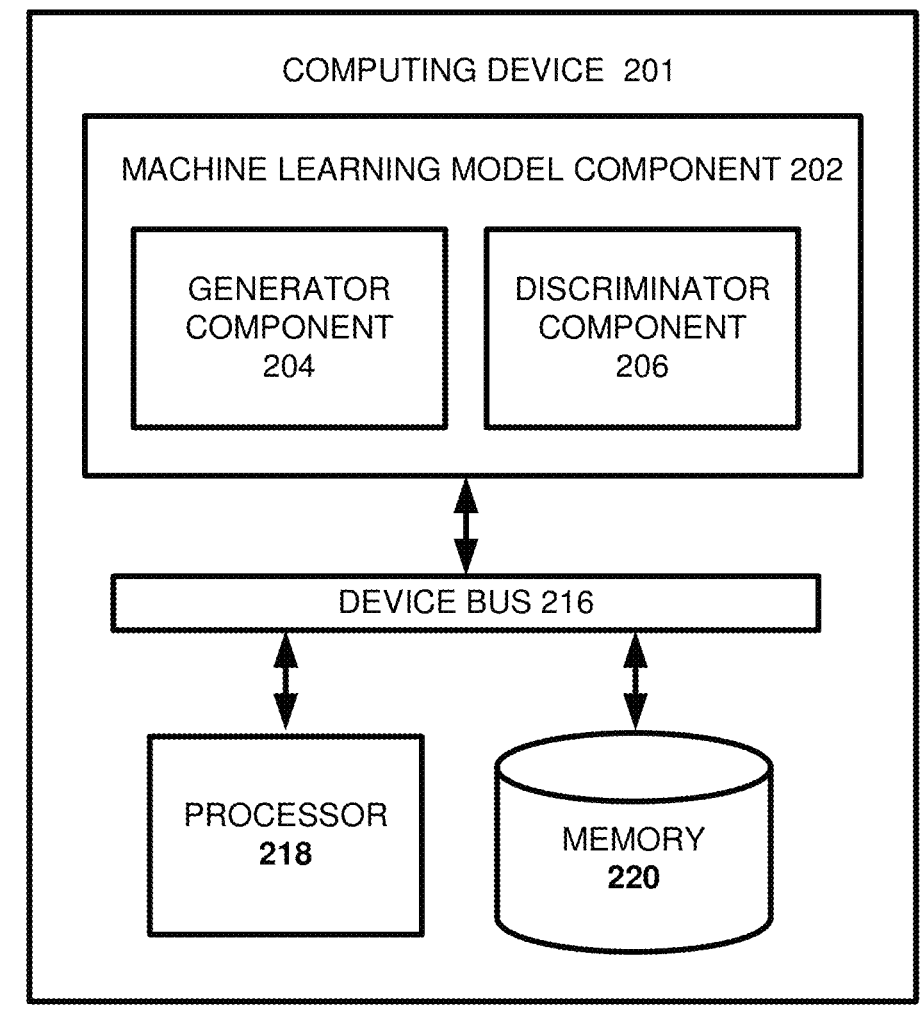
FIG. 2 illustrates a block diagram of an example, non-limiting system that facilitates generation of bird's eye view images and segmentation maps.

FIG. 2 illustrates a block diagram of an example, non-limiting system 200 that facilitates generation of bird's eye view images and segmentation maps in accordance with one or more embodiments of the disclosed subject matter.

System 200 can include a computing device 201. Computing device 201 can further comprise a machine learning model component 202, a device bus 216, a processor 218, and/or a memory 220. Machine learning model component 202 can generate a synthesized bird's eye view image from a stitched image based on removing artifacts from the stitched image present from a transformation process. For example, machine learning model component 202 can be trained to receive as input a stitched image, such as picture 101 of FIG. 1A, and output a synthesized BEV image that removes distortion and artifacts present in the stitched image, such as picture 102 of FIG. 1B. In an embodiment, machine learning model component 202 can comprise a generative adversarial model (GAN), comprising a generator component 204 and a discriminator component 206. A GAN model can be trained as an adversarial model in which a generator and discriminator are in competition with each other. Accordingly, during training, the generator generates new data representations, using encoder and decoder layers, based on a training set and the discriminator predicts whether the new data representations are real (e.g., part of the training set) or fake (e.g., generated by the generator). Both the generator and the discriminator can attempt to optimize their respective loss functions in order to beat the other. As such, based on whether the discriminator's prediction is correct, both the generator and the discriminator can be updated to improve accuracy of the new data representations.

Accordingly, in an embodiment, generator component 204 can receive as input a stitched BEV image and produce a synthesized BEV image that attempts to decrease and/or eliminate distortion and/or artifacts present in the stitched image. The stitched image and the synthesized BEV image can then be passed to the discriminator component 206 which predicts whether the synthesized BEV image is real or fake. If the discriminator component 206 makes a correct prediction, then generator component 204 can optimize a loss function to produce an updated synthesized BEV image which can then be passed to the discriminator component 206 for a second prediction. Once the generator component 204 successfully fools the discriminator component 206, the synthesized BEV image can be output. In an embodiment, generator component 204 and discriminator component 206 can additionally be utilized to generate a segmentation map based on the stitched image. For example, as described in greater detail below, in various embodiments, the segmentation map can be utilized to assist in generation of the synthesized BEV image, to assist the discriminator component 206, and/or output to another component or display screen.

Figure 3:
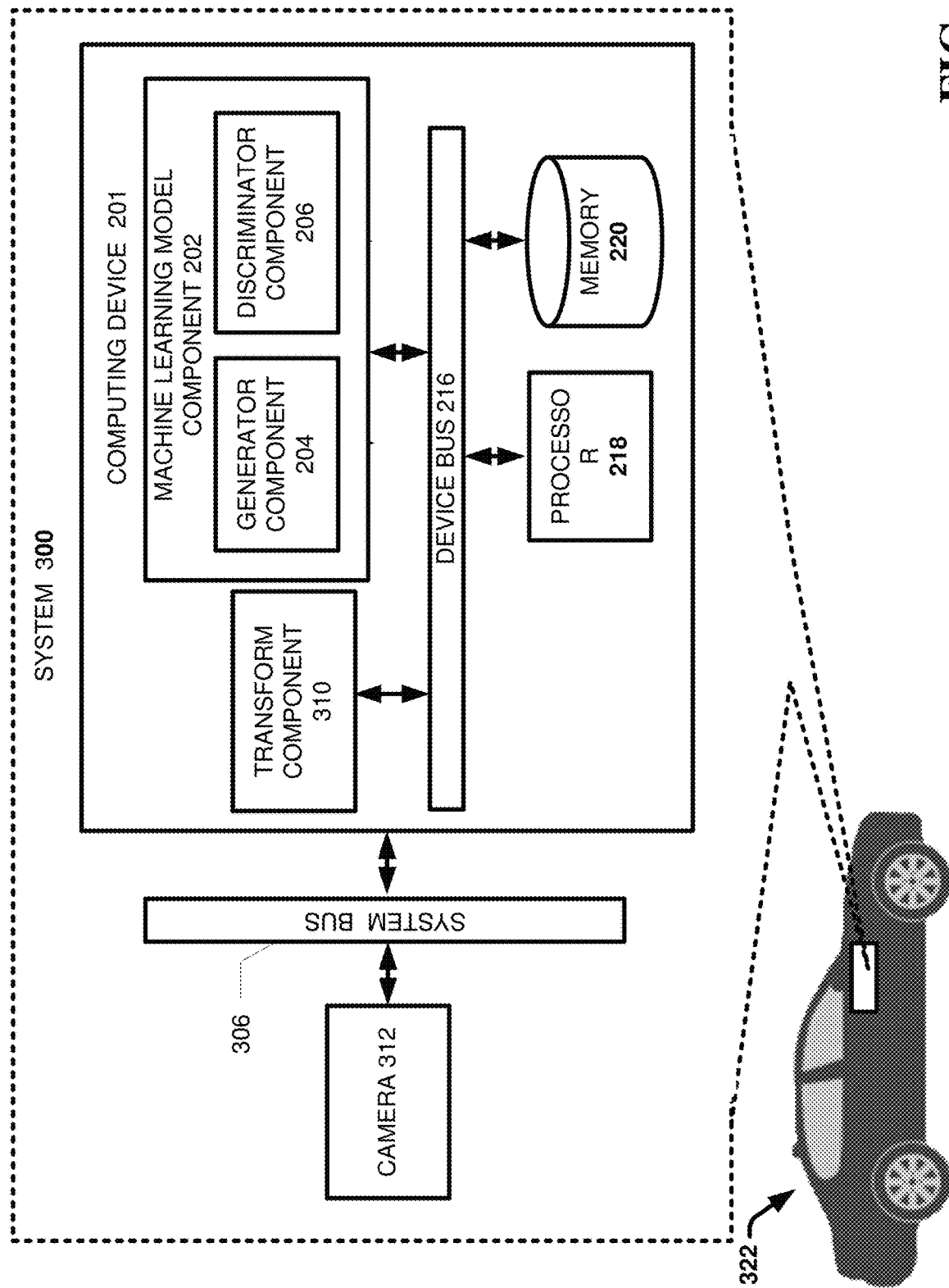
FIG. 3 illustrates a block diagram of an example, non-limiting system that facilitates generation of bird's eye view images and segmentation maps.

FIG. 3 illustrates a block diagram of an example, non-limiting system 300 that facilitates generation of bird's eye view images and segmentation maps in accordance with one or more embodiments of the disclosed subject matter. In accordance with exemplary embodiments, system 300 can be deployed on or within a vehicle, such as vehicle 322 to generate a BEV image of vehicle 322.

System 300 can comprise computing device 201 of system 200 and camera 312. In an embodiment camera 312 can comprise one or more cameras located on the exterior of vehicle 322. For example, a first camera can be located at the front of vehicle 322, a second camera on the left side of vehicle 322, a third camera on the right side of vehicle 322, and/or a fourth camera on the rear of vehicle 322. In an embodiment, one or more cameras of camera 312 can include wide angle or fish-eye lenses. It should be appreciated that any suitable arrangement, number, position, and/or type of camera is envisioned. Computing device 201 can further comprise a transform component 310. Transform component 310 can receive one or more images from camera 312. Transform component 310 can then perform a transformation and/or stitching operation on the images from camera 312 to produce a stitched image, such as picture 101 of FIG. 1A, which can be passed to machine learning model component 202 to generate a synthesized BEV image of vehicle 322. Furthermore, the synthesized BEV image can be output to a display screen located within vehicle 322. For example, the display screen can be located within the dashboard or behind the steering wheel to provide the driver of vehicle 322 with the synthesized BEV image. It should be appreciated that use of any suitable display screen and/or positioning is envisioned. In another example, the synthesized BEV image can be passed to a vehicle automation function component. For example, the vehicle automation component can utilize the synthesized BEV image to assist in performing automated driving of vehicle 322, lane detection, automated parking assistance, object detection and warning, and/or another automated vehicle function.

Camera 312 can be operatively coupled to the computing device 201 via a system bus 106. The computing device 201 can facilitate executing and controlling one or more operations of the vehicle, including operations of camera 312, transform component 310, and/or machine learning model component 202. In this regard, embodiments of systems 200 and 300 can include one or more machine-executable components embodied within one or more machines (e.g., embodied in one or more computer readable storage media associated with one or more machines). Such components, when executable by the one or more machines (e.g., processors, computers, computing devices, virtual machines, etc.) can cause one or more machines to perform the operations described.

For example, computing device 201 can further comprise or be operatively coupled to at least one memory 220 and at least one processor 218. In various embodiments, the at least one memory 220 can store executable instructions (e.g., the transform component 310 and/or machine learning model component 202) that when executed by the at least one processor 118, facilitate performance of operations defines by the executable instruction. The computing device 201 can further include a device bus 216 that communicatively couples the various components of the computing device 201 (e.g., transform component 310 and/or machine learning model component 202).

Figure 4:
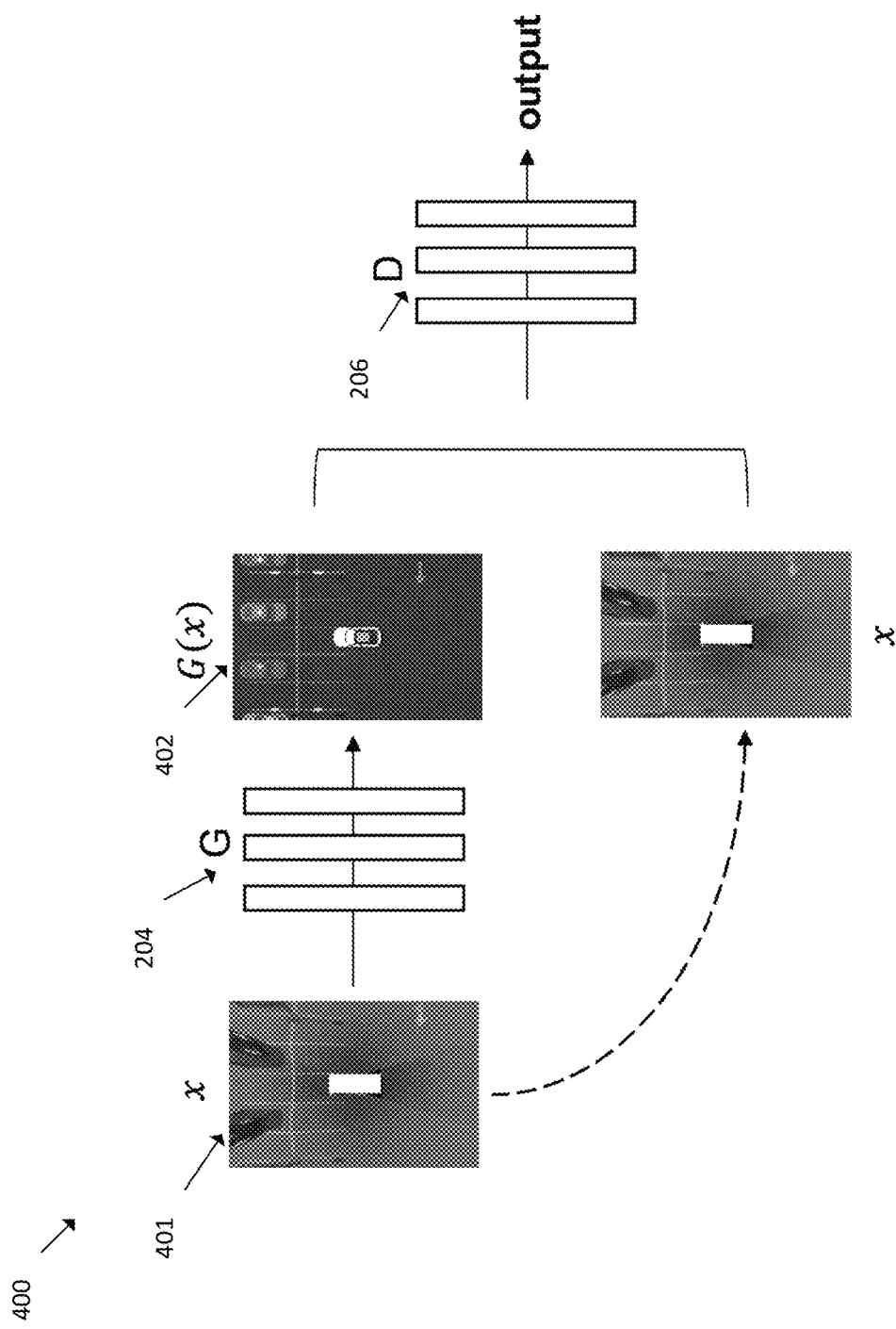
FIG. 4 illustrates block diagram of an example, non-limiting system that facilitates use of a generative adversarial model to generate bird's eye view images and segmentation maps.

FIG. 4 illustrates block diagram of an example, non-limiting system 400 that facilitates use of a generative adversarial model to generate bird's eye view images and segmentation maps in accordance with one or more embodiments of the disclosed subject matter.

System 400 can include generator component 204 and discriminator component 206. As described above, generator component 204 can receive a stitched image 401 (e.g., an image produced by transform component 310) and produce a synthesized BEV image 402 utilizing a loss function and one or more encoder and decoder layers. Discriminator component 206 can receive as input synthesized BEV image 402 and stitched image 401. Discriminator component 206 can the predict if synthesized BEV image 402 is real or generated utilizing a loss function and one or more encoder and decoder layers. If generator component 204 successfully fools discriminator component 206 (e.g., discriminator component 206's prediction is incorrect), the synthesized BEV image 402 can be output. For example, synthesized BEV image 402 can be output to a display screen to inform the driver of a vehicle of object surrounding the vehicle. In another example, synthesized BEV image 402 can be passed to a vehicle automation function such as automated parking assist or an automatic driving function. If discriminator component 206 correctly identifies synthesized BEV image as generated, then generator component 204 can produce updated synthesized BEV image 402 in order to attempt again to fool the discriminator. It should be appreciated that in one or more embodiments this feedback loop can continue until a threshold-criteria is achieved, such as a defined number of iterations, a defined amount of time, or a defined accuracy threshold. In another embodiment, generator component 204 can produce a segmentation map based on the stitched image. For example, generator component 204 can produce the segmentation map utilizing a loss function and one or more encoder and decoder layers. As described in greater detail below, in some embodiments, generator 204 can produce the segmentation map in parallel with or in sequence with synthesized BEV image 402.

FIG. 5A illustrates a block diagram of an example, non-limiting basic encoder decoder generator 500 that facilitates generation of bird's eye view images in accordance with one or more embodiments of the disclosed subject matter.

Generator 500 can comprise encoder layers 502 and decoder layers 503. The encoder layers 502 can receive as input a stitched image 401, such as picture 101 of FIG. 1A and encode stitched image 401 as a vector. The decoder layers 503 can receive as input the stitched image 401 encoded as a vector and decode the vector to produce synthesized BEV image 402.

FIG. 5B illustrates a block diagram of an example, non-liming U-Net encoder decoder generator 520 that facilitates generation of bird's eye view images in accordance with one or more embodiments of the disclosed subject matter.

Generator 520 can comprise encoder layers 512 and decoder layers 513. The encoder layers 512 can receive as input a stitched image 401, such as picture 101 of FIG. 1A and encode stitched image 401 as a vector. The decoder layers 513 can receive as input the stitched image 401 encoded as a vector and the outputs 510 of individual layers of the encoder layers 512. The decoder layer can utilize these inputs to decode the encoded vector to produce synthesized BEV image 402, which can result in improved accuracy of synthesized BEV image 402.

Figure 6:
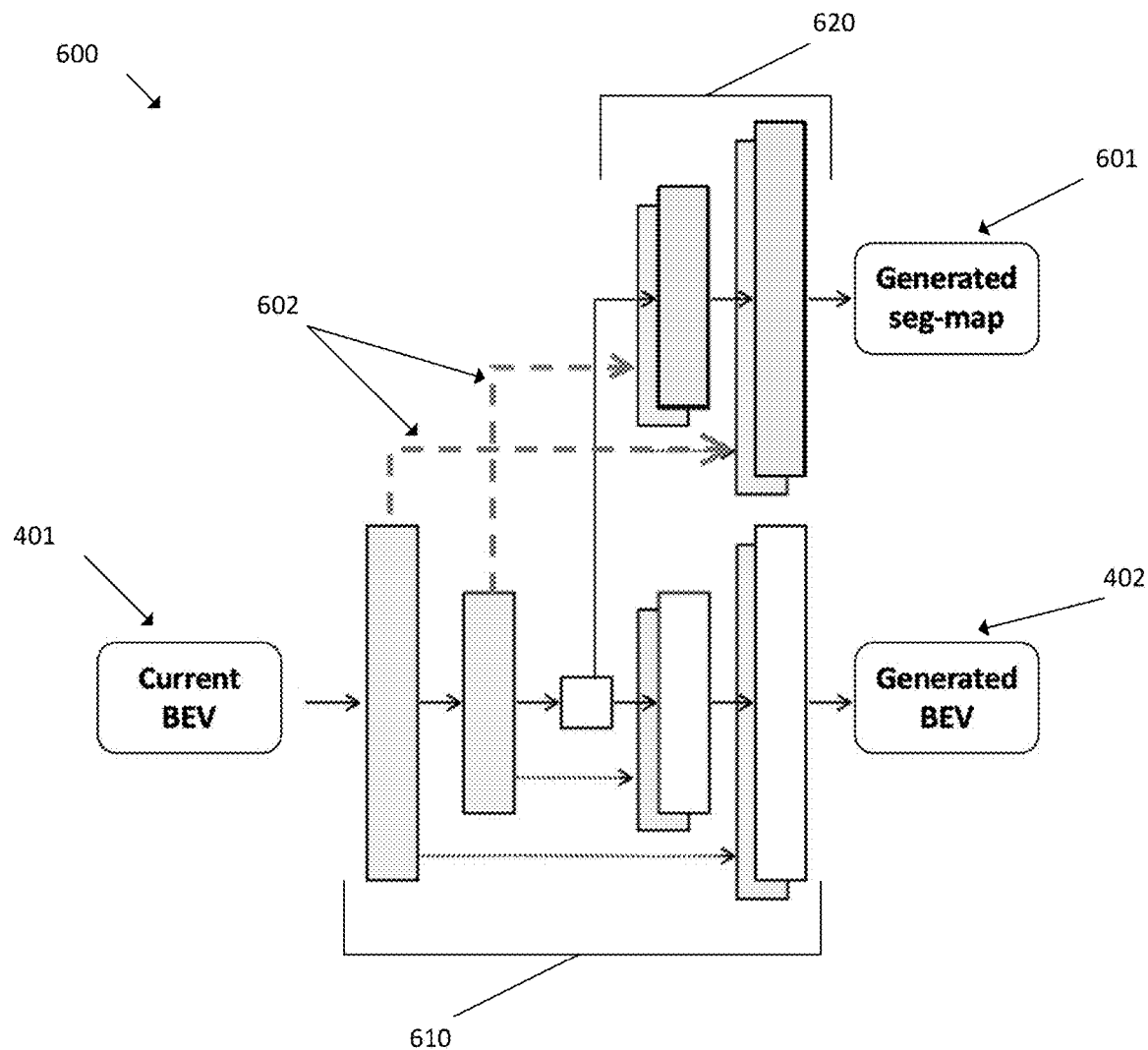
FIG. 6 illustrates a block diagram of an example, non-limiting generator that facilitates use of shared encoding layers to generate bird's eye view images and segmentation maps.

FIG. 6 illustrates a block diagram of an example, non-limiting generator 600 that facilitates use of shared encoding layers to generate bird's eye view images and segmentation maps in accordance with one or more embodiments of the disclosed subject matter.

Generator 600 can comprise a first portion 610 and a second portion 620. The first portion 610 can receive as input a stitched image 401, such as picture 101 of FIG. 1A, and utilize one or more encoding layers and one or more decoding layer to generate synthesized BEV image 402. The second portion 620 can use shared encoder layers 602 with the first portion 610 and one or more decoder layers to generate a segmentation map 601 of synthesized BEV image 402. It should be appreciated that by utilizing shared encoder layers 602 between the first portion 610 and the second portion 620, generator 600 can generate synthesized BEV image 402 and segmentation map 601 in parallel, which in some cases can enable faster generation of synthesized BEV image 402 and segmentation map 601. In some embodiments, segmentation map 601 can be passed to one or more vehicle automation functions or output to a display screen for a driver in the same or similar manner as to synthesized BEV image 402.

Figure 7:
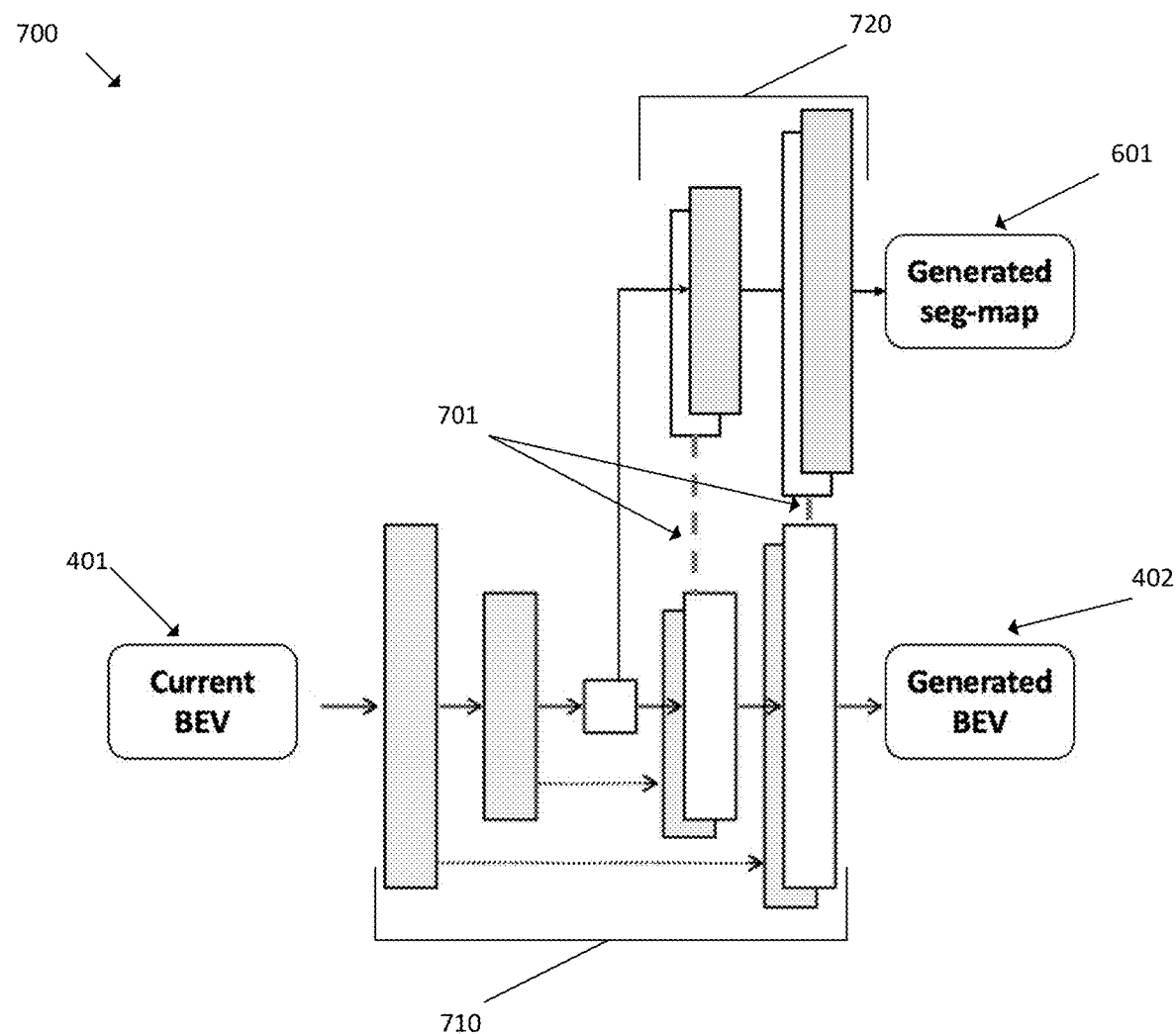
FIG. 7 illustrates a block diagram of an example, non-limiting generator that facilitates use of shared decoding layers to generate bird's eye view images and segmentation maps.

FIG. 7 illustrates a block diagram of an example, non-limiting generator 700 that facilitates use of shared decoding layers to generate bird's eye view images and segmentation maps in accordance with one or more embodiments of the disclosed subject matter.

Generator 700 can comprise a first portion 710 and a second portion 720. The first portion 710 can receive as input a stitched image 401, such as picture 101 of FIG. 1A, and utilize one or more encoding layers and one or more decoding layer to generate synthesized BEV image 402. The second portion 720 can use shared decoder layers 701 with the first portion 710 to generate a segmentation map 601 of synthesized BEV image 402. It should be appreciated that by utilizing shared decoder layers 701 between the first portion 710 and the second portion 720, generator 700 can generate synthesized BEV image 402 and segmentation map 601 in parallel, which in some cases can enable faster generation of synthesized BEV image 402 and segmentation map 601.

Figure 8:
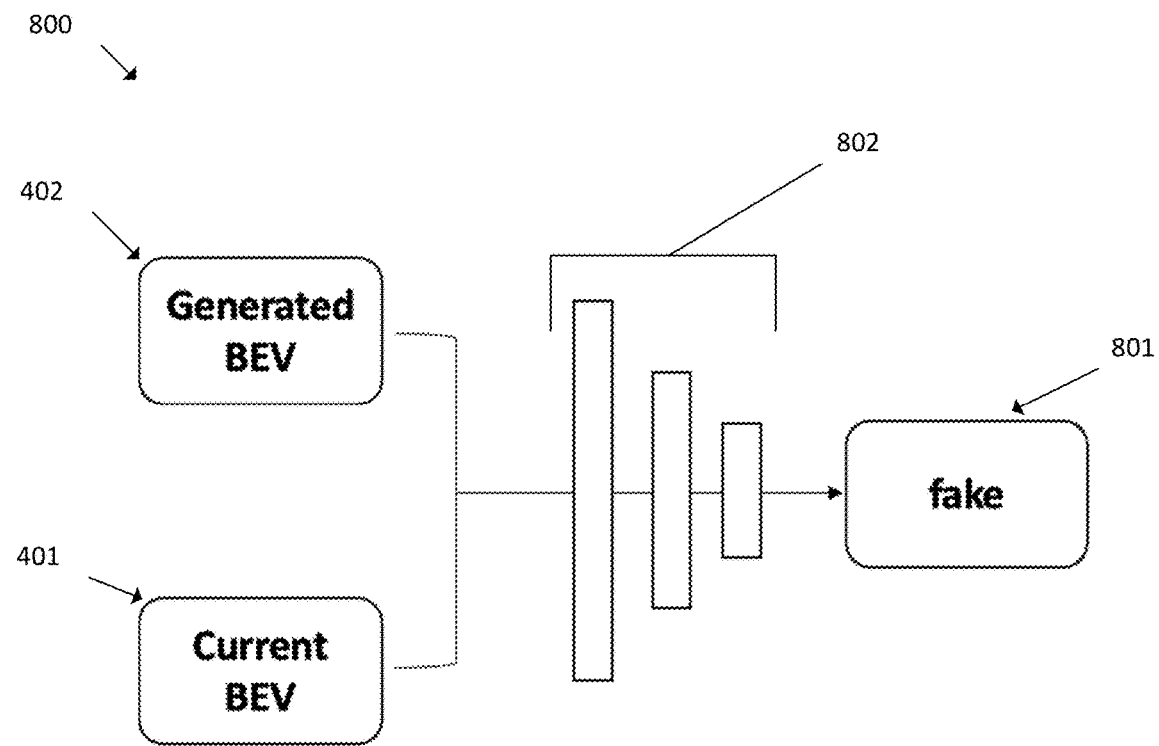
FIG. 8 illustrates a block diagram of an example, non-limiting discriminator that facilitates predicting whether a bird's eye view image is real or generated.

FIG. 8 illustrates a block diagram of an example, non-limiting discriminator 800 that facilitates predicting whether a bird's eye view image is real or generated in accordance with one or more embodiments of the disclosed subject matter.

Discriminator 800 can comprise one or more encoding layers 802. Discriminator 800 can receive as input a stitched image 401 and synthesized BEV image 402. Encoding layers 802 can encode a stitched image 401 and synthesized BEV image 402. For example, in an embodiment encoding layers 802 can encode images as vectors. Based on encoded stitched image 401 and encoded synthesized BEV image 402, discriminator 800 can predict whether synthesized BEV image 402 is real or generated.

Figure 9:
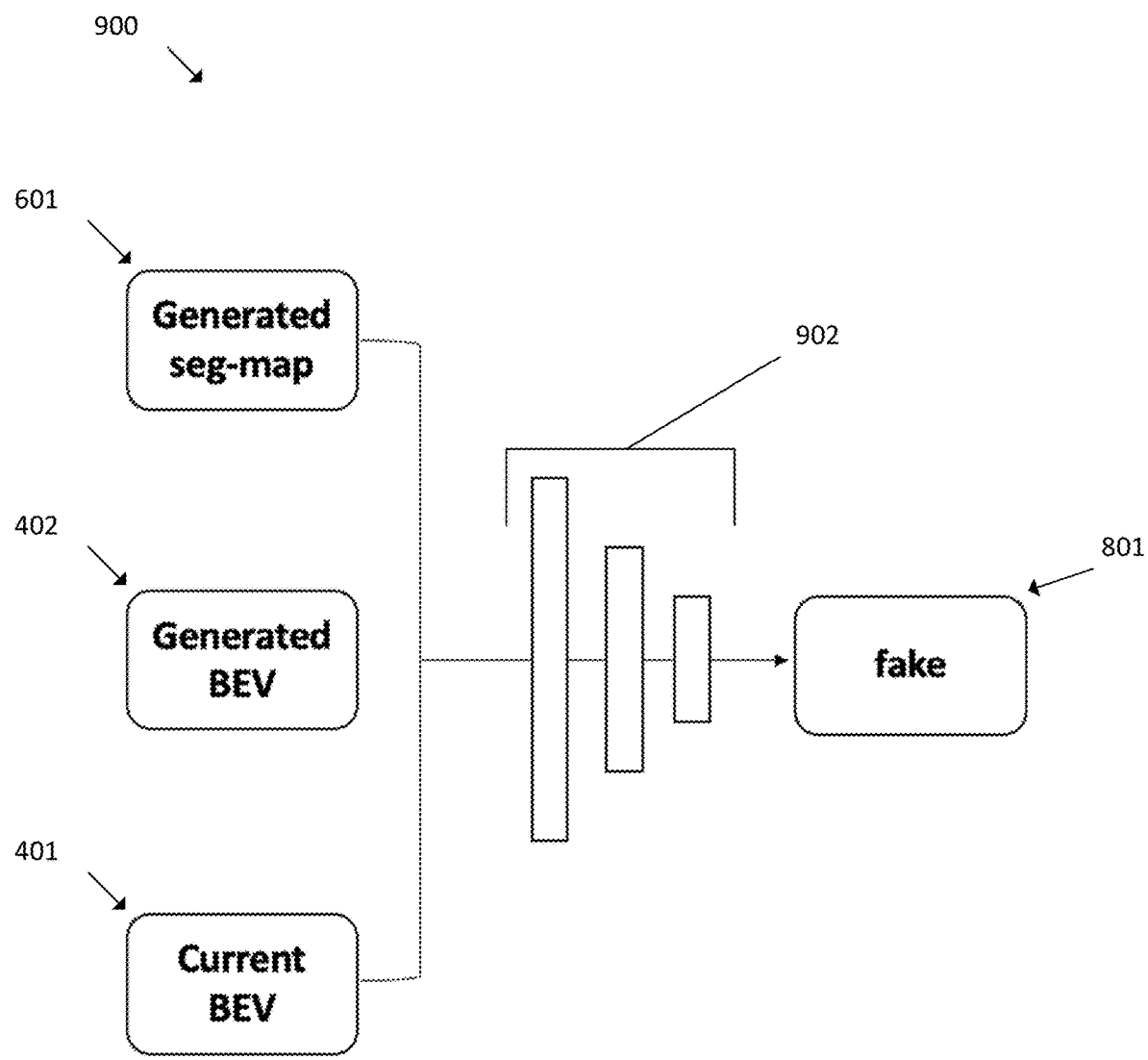
FIG. 9 illustrates a block diagram of an example, non-limiting discriminator that facilitates predicting whether a bird's eye view image is real or generated.

FIG. 9 illustrates a block diagram of an example, non-limiting discriminator that facilitates predicting whether a bird's eye view image is real or generated in accordance with one or more embodiments of the disclosed subject matter.

Discriminator 900 can comprise one or more encoding layers 902. Discriminator 900 can receive as input a stitched image 401, segmentation map 601, and synthesized BEV image 402. Encoding layers 802 can encode the stitched image 401, segmentation map 601 and synthesized BEV image 402. For example, in an embodiment, encoding layers 902 can encode images as vectors. Based on encoded stitched image 401, encoded segmentation map 601, and encoded synthesized BEV image 402, discriminator 900 can predict whether synthesized BEV image 402 and segmentation map 601 are real or generated. In some cases, by utilizing segmentation map 601, synthesized BEV image 402 and stitched image 401 as input, discriminator 900 can improve accuracy of its predictions when compared to only utilizing synthesized BEV image 402 and stitched image 401 as input.

Figure 10:
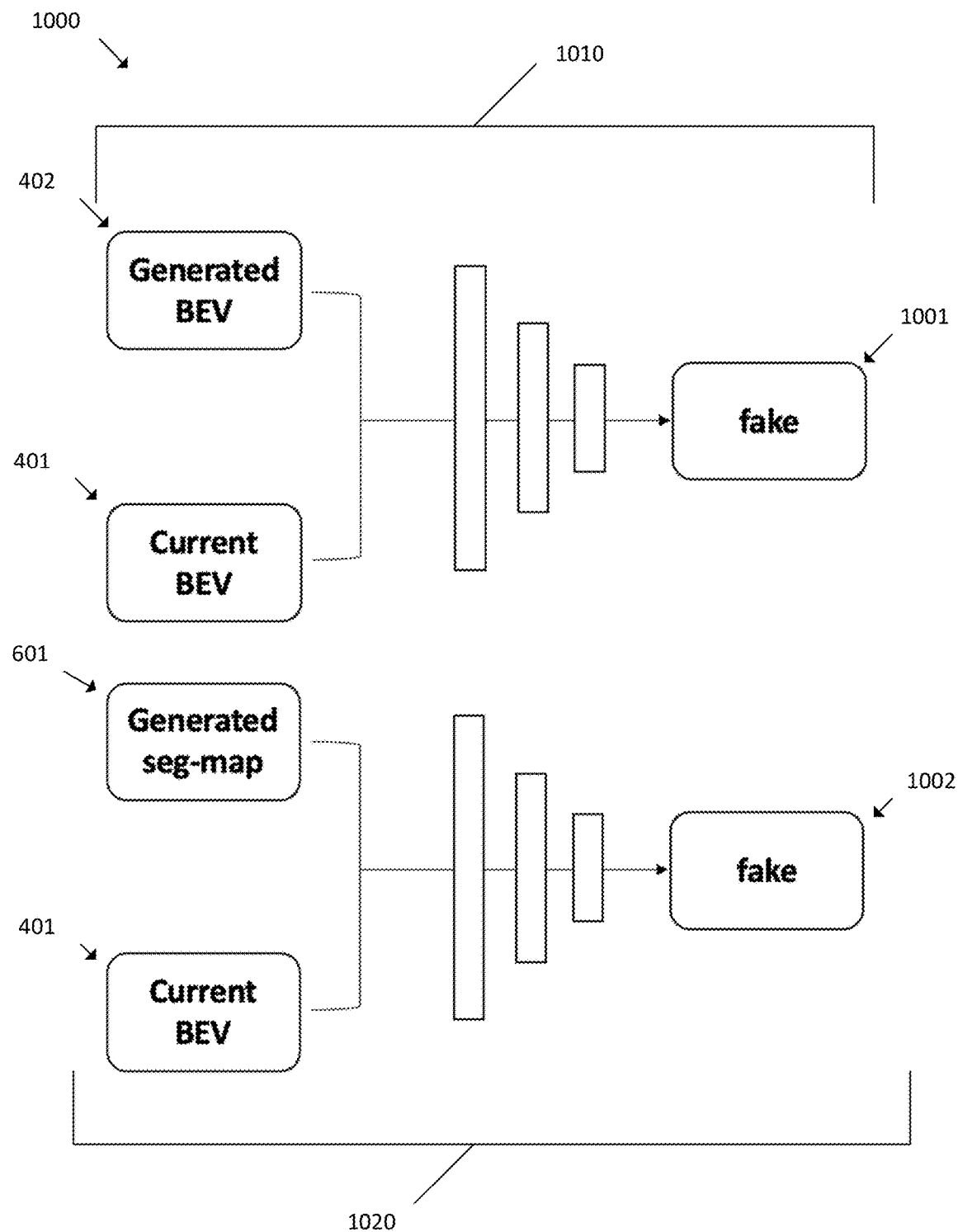
FIG. 10 illustrates a block diagram of an example, non-limiting discriminator 1000 that facilitates predicting whether a bird's eye view image and a segmentation map are real or generated.

FIG. 10 illustrates a block diagram of an example, non-limiting discriminator 1000 that facilitates predicting whether a bird's eye view image and a segmentation map are real or generated in accordance with one or more embodiments of the disclosed subject matter.

Discriminator 1000 can comprise a first discriminator 1010 and a second discriminator 1020. The first discriminator 1010 can receive as input stitched image 401 and synthesized BEV image 402 and predict whether synthesized BEV image is real or generated as described above. The second discriminator 1020 can receive as input stitched image 401 and segmentation map 601 and predict whether segmentation map 601 is real or generated as described above. It should be appreciated that by utilizing a first discriminator 1010 and a second discriminator 1020, the first and second discriminators can better specialize, potentially leading to more accurate predictions and overall better synthesized BEV images and segmentation maps.

Figure 11:
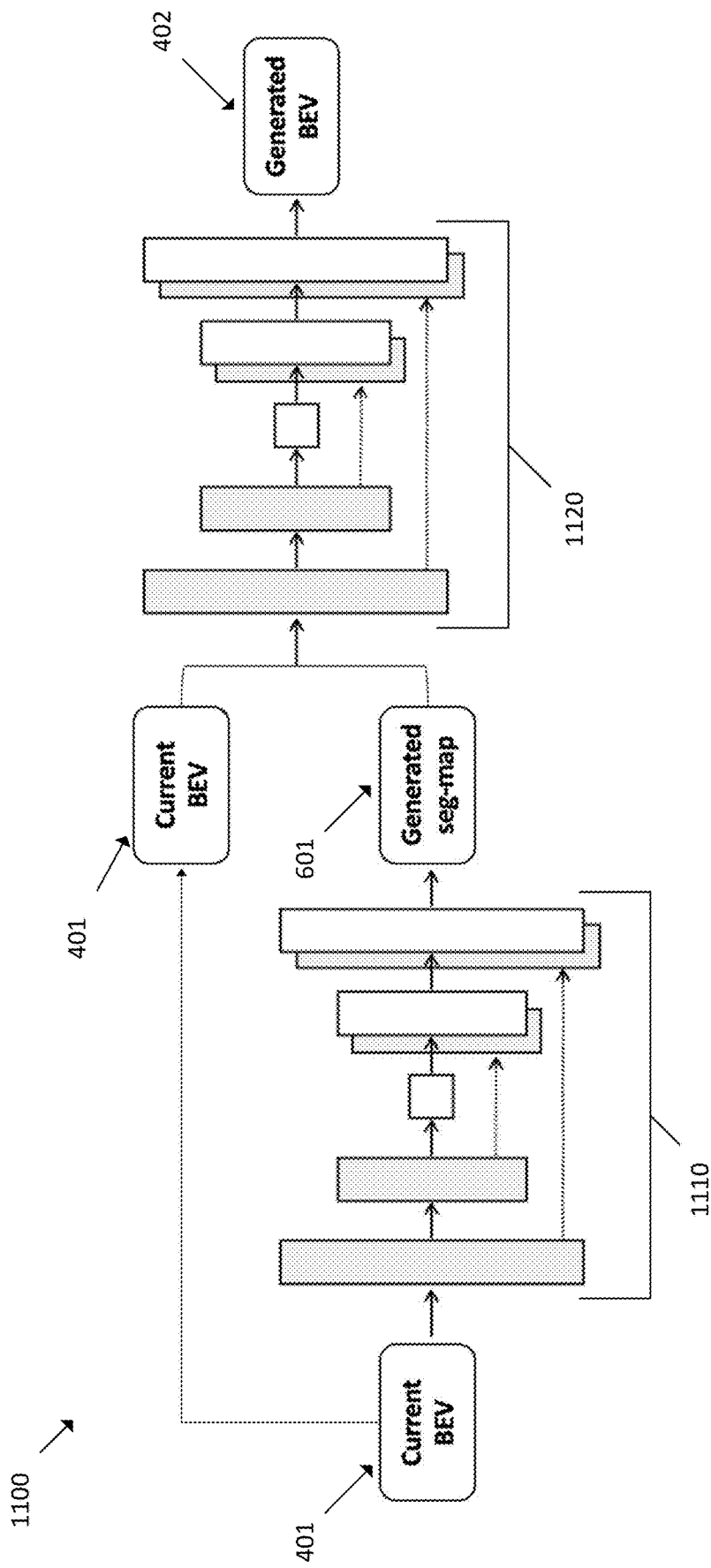
FIG. 11 illustrates a block diagram of an example, non-limiting generator that facilitates generation of bird's eye view images using an input skip connection.

FIG. 11 illustrates a block diagram of an example, non-limiting generator 1100 that facilitates generation of bird's eye view images using an input skip connection in accordance with one or more embodiments of the disclosed subject matter.

Generator 1100 can comprise a first portion 1110 and a second portion 1120. The first portion 1110 can receive as input a stitched image 401 and utilize a series of encoding and decoding layers to generate segmentation map 601. The second portion 1120 can receive as input segmentation map 601 and stitched image 401 and utilize a series of encoding and decoding layers to generate synthesized BEV image 402. As the second portion receives both stitched image 401 and segmentation map 601 as input, generator 1110 utilizes an input skip connection. Additionally, it should be appreciated that by using the segmentation map 601 as an input for the second portion 1120, generator 1100 can generate the segmentation map 601 and synthesized BEV image in sequence, thus potentially improving accuracy of the synthesized BEV image 402.

Figure 12:
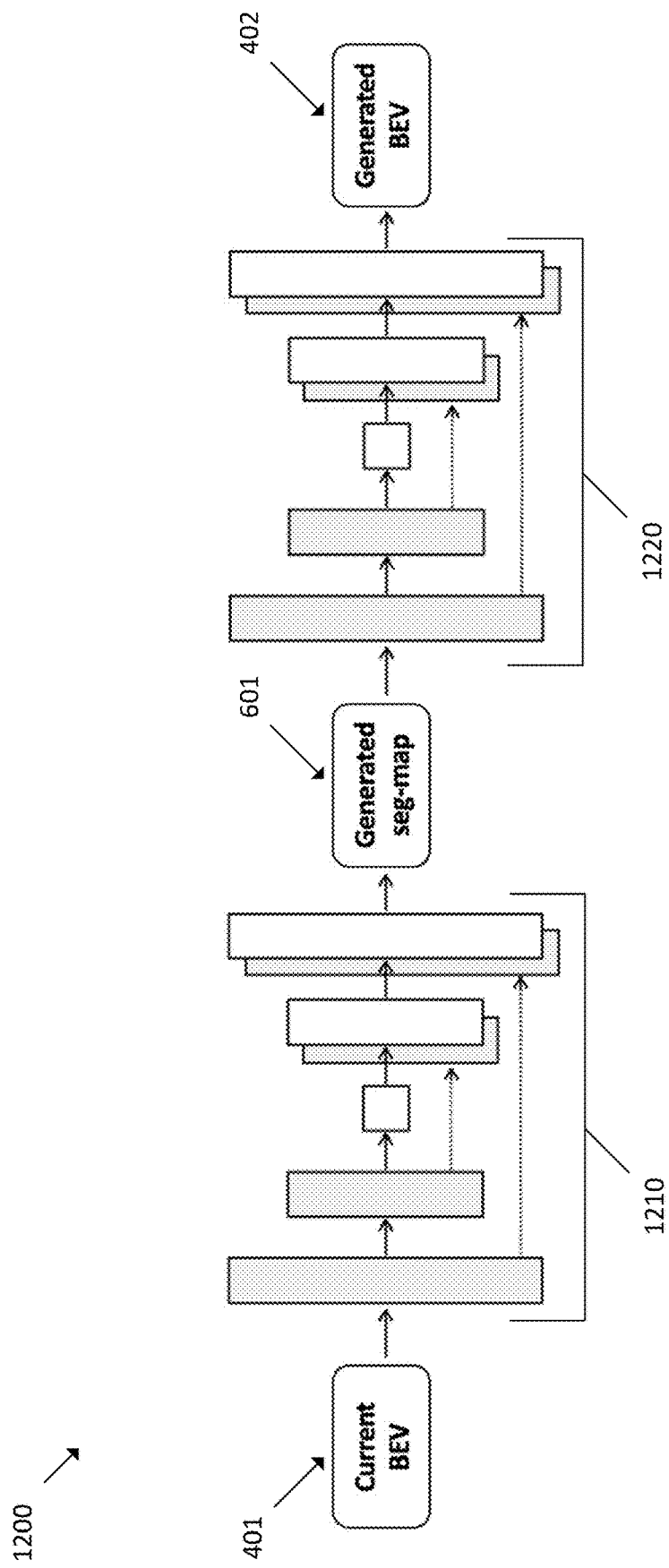
FIG. 12 illustrates a block diagram of an example, non-limiting generator that facilitates generation of bird's eye view images without using an input skip connection.

FIG. 12 illustrates a block diagram of an example, non-limiting generator 1200 that facilitates generation of bird's eye view images without using an input skip connection in accordance with one or more embodiments of the disclosed subject matter.

Generator 1200 can comprise a first portion 1210 and a second portion 1220. The first portion 1210 can receive as input a stitched image 401 and utilize a series of encoding and decoding layers to generate segmentation map 601. The second portion 1120 can receive as input segmentation map 601 and utilize a series of encoding and decoding layers to generate synthesized BEV image 402. It should be appreciated that by using the segmentation map 601 as an input for the second portion 1220, generator 1200 can generate the segmentation map 601 and synthesized BEV image in sequence, thus potentially improving accuracy of the synthesized BEV image.

Figure 13:
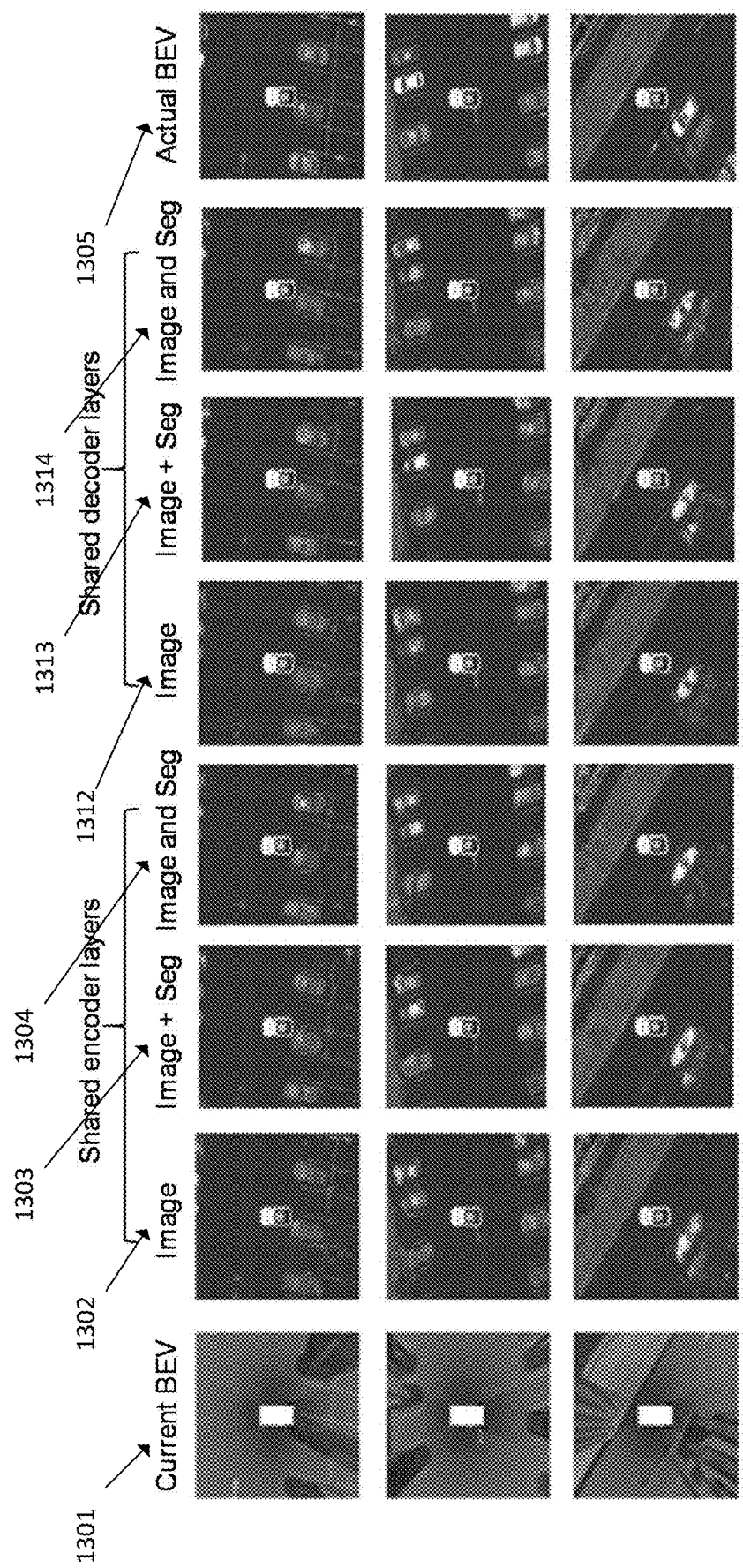
FIG. 13-14 illustrate examples of synthesized bird's eye view images.

FIG. 13 illustrates examples of synthesized BEV images generated using one or more embodiments of the disclosed subject matter.

Column 1301 shows example stitched images used as inputs to a generator, such as generator component 204. Column 1302 shows synthesized BEV images generated using a generator utilizing shared encoding layers and a discriminator and the corresponding input stitched image from column 1301. Column 1303 shows BEV images generated using a generator utilizing shared encoding layers and a discriminator, which takes a synthesized BEV image, a stitched image and a segmentation map as input, such as discriminator 900. Column 1304 shows synthesized BEV images generated using a generator utilizing shared encoding layers, a first discriminator which takes a synthesized BEV image and a stitched image as input and second discriminator which takes a segmentation map and the stitched image as input, such as first discriminator 1010 and second discriminator 1020.

Column 1312 shows synthesized BEV images generated using a generator utilizing shared decoding layers and a discriminator and the corresponding input stitched image from column 1301. Column 1313 shows BEV images generated using a generator utilizing shared decoding layers and a discriminator which takes a synthesized BEV image, a stitched image and a segmentation map as input, such as discriminator 900. Column 1314 shows synthesized BEV images generated using a generator utilizing shared decoding layers, a first discriminator which takes a synthesized BEV image and a stitched image as input and a second discriminator which takes a segmentation map and the stitched image as input, such as first discriminator 1010 and second discriminator 1020. Column 1305 shows examples of actual BEV images corresponding to the synthesized BEV images.

Figure 14:
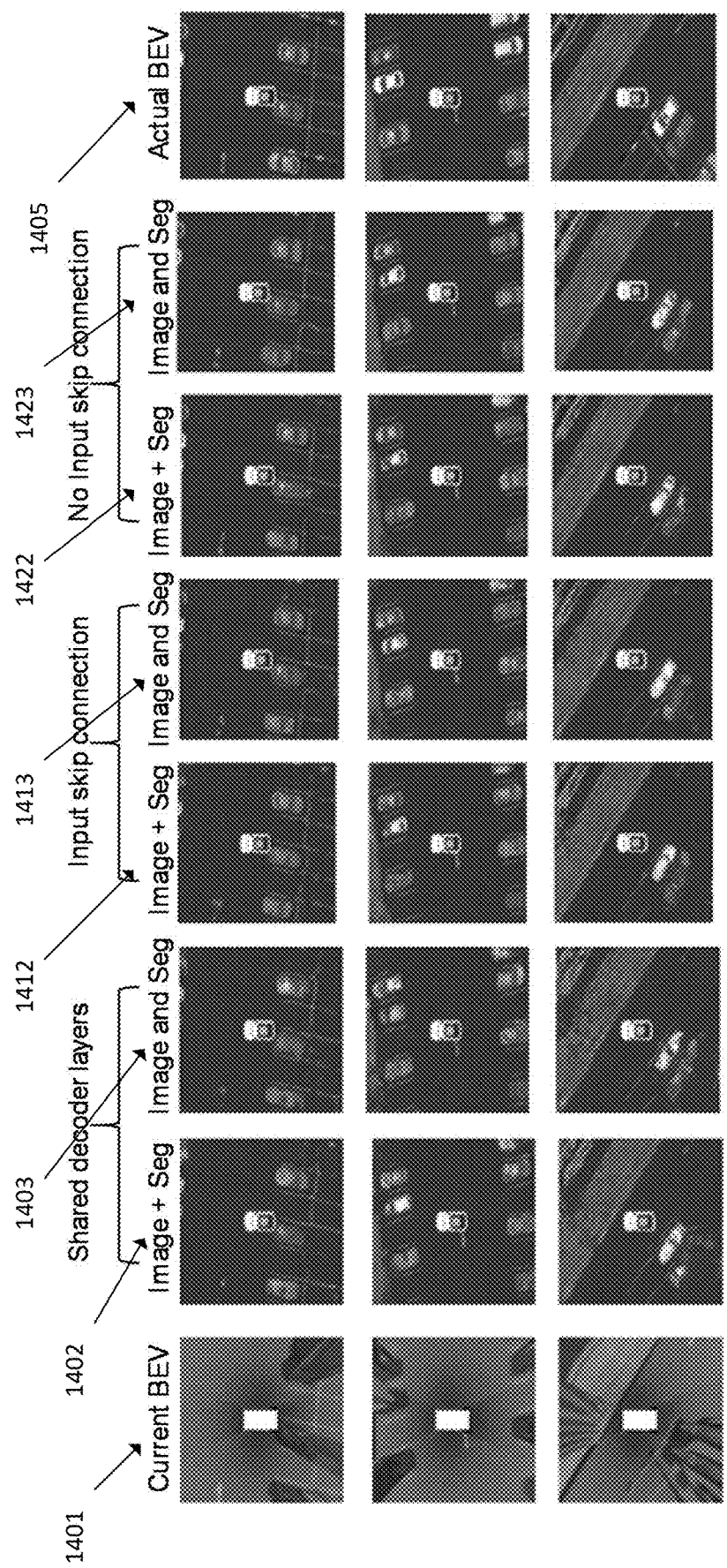

FIG. 14 illustrates examples of synthesized BEV images generated using one or more embodiments of the disclosed subject matter. Column 1401 shows example stitched images used as inputs to a generator, such as generator component 204. Column 1402 shows BEV images generated using a generator utilizing shared decoder layers and a discriminator which takes a synthesized BEV image, a stitched image and a segmentation map as input, such as discriminator 900. Column 1403 shows synthesized BEV images generated using a generator utilizing shared decoding layers, a first discriminator which takes a synthesized BEV image and a stitched image as input and second discriminator which takes a segmentation map and the stitched image as input, such as first discriminator 1010 and second discriminator 1020.

Column 1412 shows BEV images generated using a generator utilizing an input skip connection and a discriminator which takes a synthesized BEV image, a stitched image and a segmentation map as input, such as discriminator 900. Column 1413 shows synthesized BEV images generated using a generator utilizing an input skip connection, a first discriminator which takes a synthesized BEV image and a stitched image as input and second discriminator which takes a segmentation map and the stitched image as input, such as first discriminator 1010 and second discriminator 1020.

Column 1422 shows BEV images generated using a generator without an input skip connection and a discriminator which takes a synthesized BEV image, a stitched image and a segmentation map as input, such as discriminator 900. Column 1423 shows synthesized BEV images generated using a generator without an input skip connection, a first discriminator which takes a synthesized BEV image and a stitched image as input and second discriminator which takes a segmentation map and the stitched image as input, such as first discriminator 1010 and second discriminator 1020. Column 1405 shows examples of actual BEV images corresponding to the synthesized BEV images for comparison.

Figure 15:
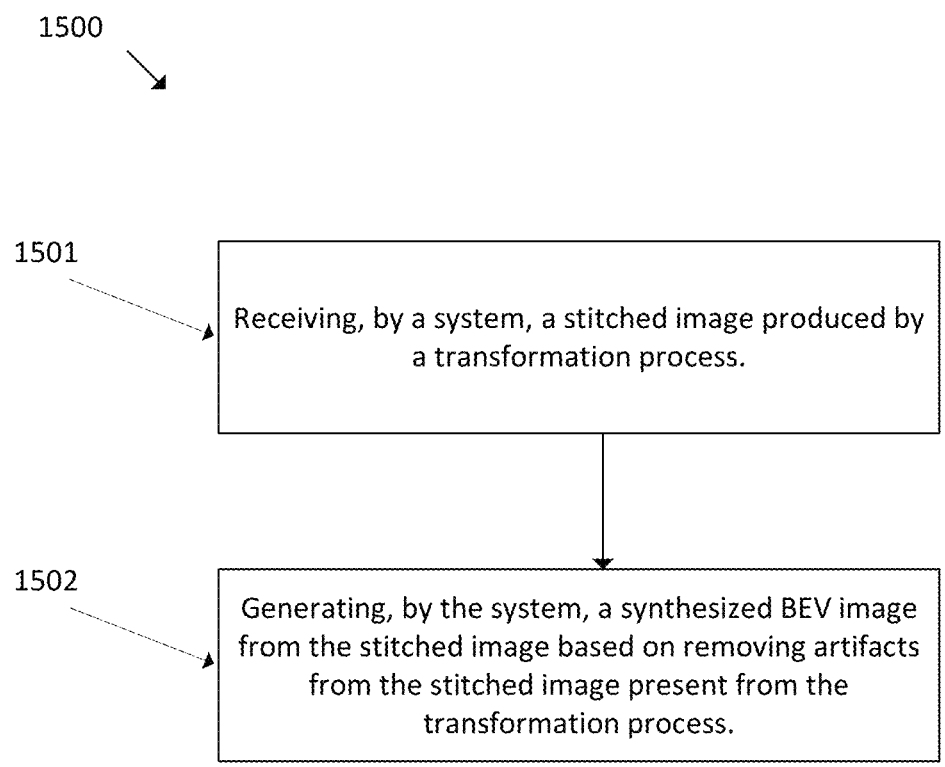
FIG. 15 illustrates a high-level flow diagram of an example-computer implemented method that facilitates generation of bird's eye view images and segmentation maps.

FIG. 15 illustrates a flow diagram of an example, non-limiting method that can facilitate generation of bird's eye view images using one or more embodiments of the disclosed subject matter. Repetitive description of like elements and/or processes employed in respective embodiments is omitted for the sake of brevity.

At 1501, computer-implemented method 1500 can comprise receiving, by a system (e.g., computing device 201 and/or machine learning model component 202) operatively coupled to a processor (e.g., 218), a stitched image produced by a transformation process.

At 1502, computer-implemented method 1500 can comprise generating, by the system (e.g., computing device 201, machine learning model component 202, generator component 204 and/or discriminator component 206), a synthesized BEV image from the stitched image based on removing artifacts from the stitched image present from the transformation process.

In the above examples, it should be appreciated that system 200 can provide improvements to the generation and utilization of BEV images related to vehicle functions. For example, by generating a synthesized BEV image without artifacts or distortion present as in stitched images, system 200 can improve the performance of automated vehicle functions that utilize BEV images as input, such as road lane detection, object detection, parking assist, and other functions as system 200 can generate a more accurate and useable BEV image that more clearly captures objects and the area surrounding a vehicle. Additionally, system 200 can improve a user's driving experience by outputting the synthesized BEV to a driver or operator through a visual display, such as a display screen located within the vehicle. Accordingly, a practical application of system 200 is that it can be utilized to provide an input which improves performance of automated vehicle functions when compared to existing BEV generation methods.

The one or more embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Various aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing one or more embodiments, but one of ordinary skill in the art can recognize that many further combinations and permutations of these embodiments are possible. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The terminology used herein was chosen to best explain the principles of the embodiments, the practical application or technical improvement over technologies found in the marketplace, or to enable others of ordinary skill in the art to understand the embodiments disclosed herein. In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What is claimed is:

1. A system, comprising:
   a memory that stores computer executable components; and
   a processor that executes the computer executable components stored in the memory, wherein the computer executable components comprise:
      a machine learning model component comprising:
         a generator that generates, using shared encoder layers of the generator:
            a synthesized bird's eye view image from a stitched image based on removing artifacts from the stitched image present from a transformation process, and
            a segmentation map from the stitched image;
         a discriminator that predicts whether the synthesized bird's eye view image and the segmentation map are real or generated.

2. The system of claim 1, wherein the generator is updated based on the prediction of the discriminator, resulting in an updated generator.

3. The system of claim 1, wherein the generator produces the synthesized bird's eye view image and the segmentation map in parallel.

4. The system of claim 1, wherein the generator produces the synthesized bird's eye view image and the segmentation map in sequence.

5. The system of claim 1, wherein the discriminator comprises a first discriminator and a second discriminator.

6. The system of claim 5, wherein the first discriminator predicts whether the synthesized bird's eye view image is real or generated, and wherein the second discriminator predicts whether the segmentation map is real or generated.

7. A computer-implemented method comprising:
   generating, by a system comprising a processor, using a generator of a machine learning model:
      a synthesized bird's eye view image from a stitched image based on removing artifacts from the stitched image present from a transformation process, wherein the synthesized bird's eye view image and the segmentation map are produced using shared encoder layers of the generator, and
      a segmentation map from the stitched image; and
   predicting, by the system, using a discriminator of the machine learning model, whether the synthesized bird's eye view image and the segmentation map are real or generated.

8. The computer-implemented method of claim 7, further comprising:
   updating, by the system, the generator based on the prediction, resulting in an updated generator.

9. The computer-implemented method of claim 7, wherein the synthesized bird's eye view image and the segmentation map are generated in parallel.

10. The computer-implemented method of claim 7, wherein the synthesized bird's eye view image and the segmentation map are generated in sequence.

11. The computer-implemented method of claim 8, wherein the synthesized bird's eye view image and the segmentation map are generated using an input skip connection.

12. A computer program product comprising a computer readable storage medium having program instructions embodied therewith, the program instructions executable by a processor to cause the processor to:
   generate, using a generator of a machine learning model:
      a synthesized bird's eye view image from a stitched image based on removing artifacts from the stitched image present from a transformation process, wherein the synthesized bird's eye view image and the segmentation map are produced using shared encoder layers of the generator, and
      a segmentation map from the stitched image; and
   predicting, using a discriminator of the machine learning model, whether the synthesized bird's eye view image and the segmentation map are real or generated.

13. The computer program product of claim 12, wherein the synthesized bird's eye view image and the segmentation map are generated in parallel.

14. The computer program product of claim 12, wherein the synthesized bird's eye view image and the segmentation map are generated in sequence.

15. The computer program product of claim 12, wherein the synthesized bird's eye view image and the segmentation map are generated using an input skip connection.

16. The computer program product of claim 12, wherein the program instructions are executable by the processor to further cause the processor to:
   update the generator based on the prediction, resulting in an updated generator.

17. The computer program product of claim 16, wherein the program instructions are executable by the processor to further cause the processor to:
   generate, using the updated generator, an updated synthesized bird's eye view image from the stitched image.

18. The system of claim 2, wherein the updated generator generates an updated synthesized bird's eye view image from the stitched image.

19. The computer-implemented method of claim 8, further comprising:
   generating, using the updated generator, an updated synthesized bird's eye view image from the stitched image.

20. The computer-implemented method of claim 7, wherein the discriminator comprises:
   a first discriminator that predicts whether the synthesized bird's eye view image is real or generated; and
   a second discriminator that predicts whether the segmentation map is real or generated.

* * * * *